Dec. 19, 1950     E. E. HOWSCHULTZ     2,534,516
ANIMAL TRAINING DEVICE
Filed Sept. 17, 1949     2 Sheets-Sheet 1
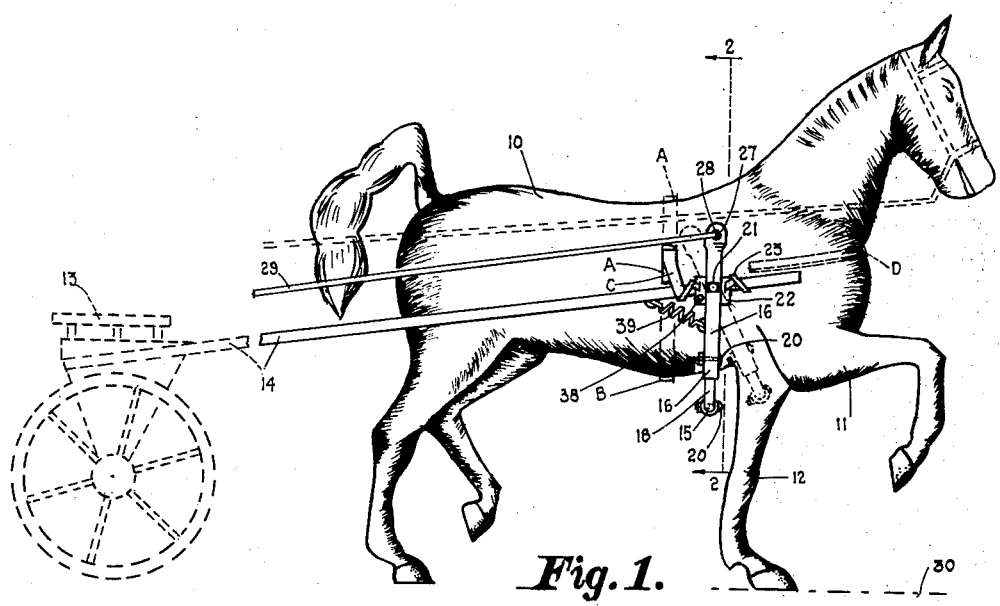
Fig. 1.
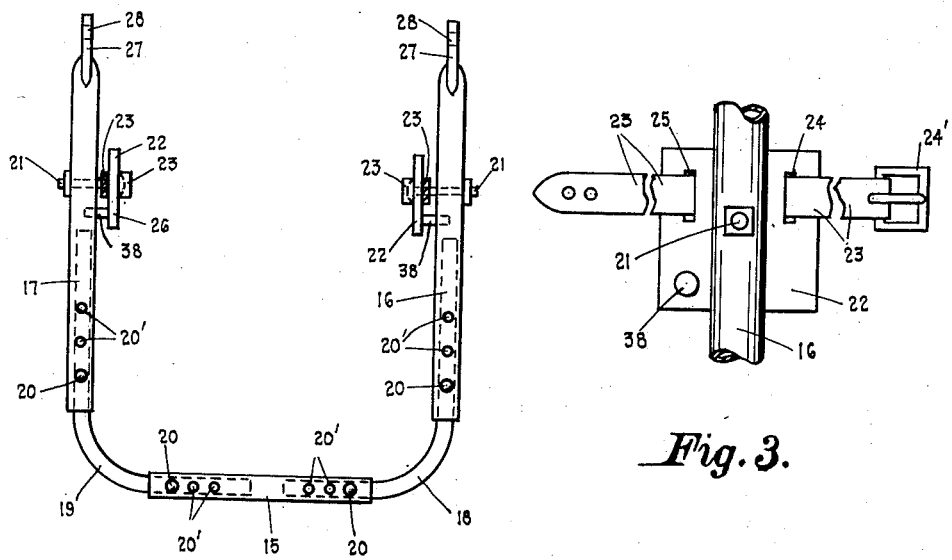
Fig. 2.
Fig. 3.
Inventor
Erie E. Howschultz,
By Arthur H. Sturges
Attorney Patented Dec. 19, 1950

2,534,516

UNITED STATES PATENT OFFICE 2,534,516

ANIMAL TRAINING DEVICE

Erie E. Howschultz, Little Sioux, Iowa

Application September 17, 1949, Serial No. 116,355

7 Claims. (Cl. 54—71)

The present invention relates to animal training devices and more particularly to training of horses.

It is an object of the invention to provide a device which may be readily attached to the harness equipment of a horse for training the animal to raise its forelegs comparatively high for show purposes.

Another object of the invention is to provide a device for the above stated purpose which is economical in construction, efficient in operation and which may be employed by a trainer mounted on the back of a horse with equal facility with respect to a trainer seated in a sulky or buggy towed by a horse during horse training operations.

Other and further objects and advantages of the invention will be understood from the following detailed description thereof.

In the drawings,

Figure 1 is a side view of a show horse having the new device applied thereto in a position of use, a sulky employed being partially depicted in dotted lines.

Figure 2 is a transverse section taken on line 2—2 of Figure 1, the horse and certain portions of the harness accouterments of the horse being omitted therefrom and showing the new device on an enlarged scale.

Figure 3 is a plan view of a means employed for attaching the certain other portions of the new device to the shafts of a training sulky, certain portions of a strap employed being broken away.

Figure 4:
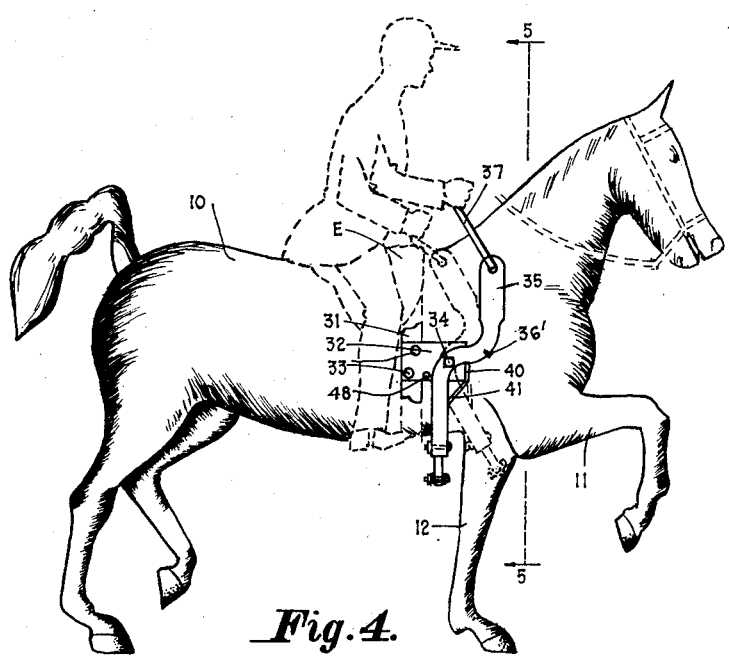
Figure 4 is a side view of the horse shown in Figure 1 and depicting a modification of the new device, said modification being particularly useful for training a horse at times when the operator is mounted upon the back of the horse in lieu of an employment of the sulky shown in Figure 1.

Referring now to the drawing for a more particular description, 10 indicates a show horse to be trained having a right foreleg 11 and a left foreleg 12. A training sulky 13 is represented by dotted lines in Figure 1, said sulky having towing shafts 14 which are disposed at opposite sides of the horse. The forward ends of the shafts, in use, terminate rearwardly of the chest of the horse in a conventional manner.

The new device includes a main body portion 15 having oppositely disposed arms 16 and 17.

As best shown in Figure 2 said main body, adjunct parts and arms are arranged to provide an approximately U-shaped configuration in plan, being formed preferably of aluminum tubing.

The arms 16 and 17 respectively receive ends of arcuate members 18 and 19 therein, said members being also formed of aluminum tubing. The members 18 and 19 are of a lesser cross-sectional outside diameter than the diameter of the inner annular walls of the members 15, 16 and 17, whereby the ends of the members 18 and 19 are respectively received telescopically within the members 16 and 17, together with the main body portion 15 as best depicted in Figure 2.

The connecting ends of the parts 15 through 19 are provided with a plurality of spaced bolt holes 20' through which bolts or suitable keepers 20 are extended, whereby the substantially U-shape frames are adjustable both horizontally and vertically.

It will be understood that the substantially U-shaped portion of the new device may be readily extended transversely to correspond with the distance between the shafts 14 of a sulky and also the width of a horse. The arm portions of the U-shape frame may be adjusted in a vertical direction corresponding with the height of a horse, whereby ponies or colts may be readily trained together with mature and higher horses.

The arm 16 is pivotally attached, as by means of a bolt, rivet or other suitable keeper indicated at 21 to a plate 22 as best shown in Figure 3. The plate 22 is provided with a strap 23 which is inserted or reeved through suitable apertures 24 and 25 of the plate whereby the inner surface of the plate 22 may be placed against the outer surface of the right hand shaft 14 of the sulky 13 and locked to said shaft by means of wrapping the strap taut around the shaft and securing the ends of the strap together as best shown in Figure 1, or by means of the buckle 24' of the strap, said buckle being depicted in Figure 3.

It will be understood that a like plate 26, shown in Figure 2, together with a strap and pivot pin is employed for securing the plate 26 to that shaft of the sulky which is at the left hand side of the horse, said plate 26 and certain of its adjunct parts being best shown in Figure 2.

Referring to Figure 1, the back strap of the harness for the horse 10 is indicated at A and the belly band or girth strap at B by means of dotted lines, a portion of the strap A being shown in full lines. From the back strap A at each side of the horse the conventional leather loops C depend for holding the forward ends of the shafts 14 upwardly alongside of the horse. Obviously the above described plates 22 and 26 may be riveted or otherwise suitably secured to the girth strap B or the back strap A of the harness in lieu of attaching said plates to the shafts 14 of the training sulky and if desired a separate strap may be disposed around the body of the horse 10 rearwardly of the forelegs 11 and 12 for supporting said plates 22 and 26 in an operative position for purposes later described. The chest strap of the harness is represented by dotted lines and indicated at D.

The upper ends of the tubular arms 16 and 17 are preferably flattened as indicated at 27 in Figure 2 and as best shown in Figure 1 said upper ends are each provided with an eye 28 for respectively receiving therethrough the ends of a flexible strand 29, said strand being U-shaped in plan preferably. The strand may be formed of a rope, strap or light chain as may be desired, whereby at times when the operator is seated on the sulky during training operations, he may grasp adjacent portions of the strand or lines 29 in one hand and pull the strand towards himself for causing a corresponding swinging movement of the main body portion 15 of the new device forwardly and into contact with the forelegs of the horse during training operations and during the alternate and successive raising and lowering by the horse of its said forelegs while traveling forwardly.

At this time the trainer preferably speaks to the horse and states, in substance "Get em up!" "Get em up!" and at the time the main body portion 15 of the new device contacts the said forelegs, whereby the horse rapidly learns what is wanted; namely, to raise the forelegs together with his hoofs higher above the ground 30 than is normal for training the horse for show display purposes.

It will be understood that at the forward side of the main body portion 15, if so desired, a row of small protuberances or spurs may be provided for augmenting the said training, although for the majority of horses it has been found in actual practice, that the said spurs are not needed.

Referring to the modification shown in Figure 4, 31 indicates the belly band or cinch strap of a saddle E or, if desired, a separate strap not connected to the saddle E may be employed, said strap being secured over the back of the horse and around the belly thereof by any suitable means such as the employment of a buckle on the said strap similarly with respect to the conventional straps A and B shown in Figure 1 and as herein mentioned in connection with the modification shown in Figure 1. The modification of the means for attaching the new device to the harness equipment of the horse or to a separate strap disposed around the horse as shown in Figure 4, includes oppositely disposed plates 32 which are riveted or otherwise suitably secured, as indicated at 33, to the belly band 31 shown in Figure 4 or to the girth strap of the saddle E, for pivotally supporting the other portions of the modification of the new device similar to the manner heretofore described with respect to Figure 1.

The modification shown in Figure 4 includes pivots 34. The upper portions of the arms 35 and 36 of the modification are preferably offset as at 36' as shown in Figure 4, whereby the offset portions of said arms are disposed farther forwardly of the horse than the upper portions of the straight arms shown in Figure 1 for the purpose of providing room for the trainer's knees at times when the saddle E is disposed further toward the chest of the horse than as shown in Figure 4. For average use the off-sets 36' may be dispensed with.

The operator may grasp the flexible strand 37 of the modification in one hand for swinging the main body portion of the modification forwardly against the forelegs of the horse and in the manner and for the purposes heretofore described. Obviously the strand 37 may be dispensed with if the operator desires to grasp and move the upper end of the off-set of an arm directly. However, the flexible strand 29, shown in Figure 1, is essential to operation when a sulky is employed.

The supporting plates 32 of the modification and the similar plates 22 of the sulky arrangement of parts are provided with cooperative detent pins 48 and 38, respectively, for limiting a swinging movement rearwardly of those portions of the arms of the new device which are disposed below the pivot pins whereby the main body portion of the new device may be readily applied to the forelegs of the horse during training operations. Also the detents prevent a swinging of the member 45 against the rear portions of the belly of the horse at undesired times which would otherwise tend to teach the horse to rear or buck during training operations. Cooperative resilient means are provided for both the modification shown in Figure 4 and for the device shown in Figure 1 for causing the main body portions of both of the modifications of the new device to normally engage against said detent pins when not in use and for preventing said main body portions from contacting the forelegs of the horse at undesired times.

Figure 5:
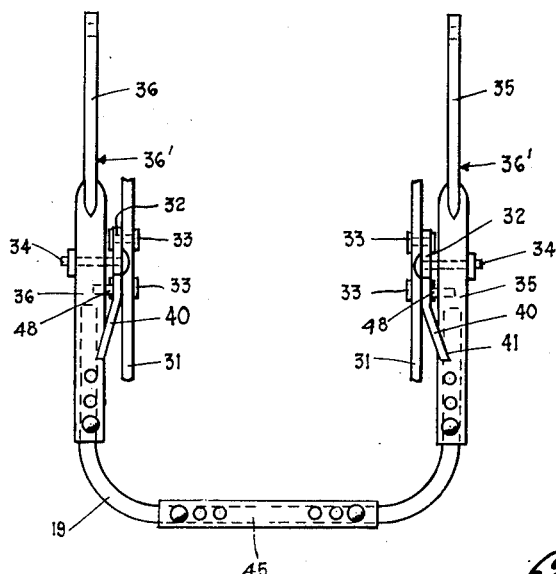
Figure 5 is a transverse section taken on line 5—5 of Figure 4 certain portions of the new device being omitted together with the said horse.

As specifically shown in Figure 1, the said resilient means includes a coiled spring 39 having its opposite ends respectively attached to the shaft 14 of the sulky and to the lower portion of the arm 16 for urging said lower portion of the arm, together with the main body portion 15, rearwardly whereby the said main body portion is prevented from contacting with the forelegs of the horse at undesired times. The said cooperative resilient means is preferably employed since otherwise the main body portion 15 would otherwise contact with the legs of the horse incident to swinging movements of the arms occasioned by the jolts and jars applied resultant from road traveling movements of the horse during training operations. At times when the member 15 is provided with a row of spurs the said resilient means is necessarily employed especially during a training of young horses. The resilient means for the riding or saddle modification includes a flat spring 40 having an upper end thereof rigidly attached to the plate 32 of the modification as shown in Figure 4. The lower or free end 41 of the flat spring 40 engages against the arm 35 as best shown in Figure 5 for urging the said lower portion of the arm rearwardly and for the purposes heretofore mentioned concerning the coil spring 39 shown in Figure 1. Preferably two flat springs 40 are employed as shown in Figure 5.

From the foregoing description it is thought to be obvious that an animal training device constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A device for training a harnessed horse comprising an approximately U-shaped member having a main body portion and two spaced apart arms respectively extending from opposite end portions of said main body, a support for each arm, pivotal connections between said supports and said arms, flexible members attached to the upper ends of the arms above the pivotal connections thereof for actuating the said main body portion forwardly, and means for attaching said supports to the harness equipment of said horse at opposite sides of the latter for mounting said main body swingably across the belly of the horse adjacent to and rearwardly of the forelegs of the horse.

2. A device as defined in claim 1 which further includes detent means for limiting a swinging movement of said main body in a direction away from the said forelegs.

3. A device as characterized as in claim 1 which further includes detent means for limiting swinging movement of said main body portion rearwardly and resilient means for urging the main body portion away from the forelegs of the horse and against the said detent means.

4. A device for training a harnessed horse comprising an approximately U-shaped member having a main body portion and two spaced apart arms respectively extending from opposite end portions of said body, a supporting plate for each arm, pivotal connections between said plates and said arms, means for attaching said plates to the harness equipment of said horse at opposite sides of the latter for disposing said main body swingably across and under the belly of the horse adjacent to and rearwardly of the forelegs of the horse, said main body being adapted to be swung into contact with the forelegs of the horse during training operations, detent means for limiting a swinging movement of said main body in one direction, resilient means for normally urging said main body portion toward said detent means and manipulatable means for causing said main body portion to swing, at desired times against the forelegs of the horse and against the urge of said resilient means.

5. An animal training harness comprising a leg engaging member, support means for suspending the said leg engaging member below the breast of an animal and behind the forelegs thereof, means pivotally attaching the said leg engaging member to the support means, lines extended from ends of said leg engaging member that extend upwardly from said pivotal attaching means, means limiting rearward movement of said leg engaging member, and resilient means urging said leg engaging member against the said limiting means.

6. In an animal training harness, the combination which comprises a leg engaging member having upwardly extended arms, support means having straps extended therefrom for suspending the said leg engaging member below the breast of an animal and behind the forelegs thereof, means pivotally attaching the arms of said leg engaging member at points intermediate of the length thereof to the said support means, lines extended from the upper ends of the arms of the said leg engaging member for urging the leg engaging member against the forelegs of the animal, means limiting rearward movement of the said leg engaging member, and a spring for urging the said leg engaging member toward the said limiting means.

7. In an animal training harness, the combination which comprises a leg engaging member having upwardly extended arms, means adjusting the length of said leg engaging member, means adjusting the length of said upwardly extended arms of the leg engaging member, support means having straps extended therefrom for suspending the said leg engaging member below the breast of an animal and behind the forelegs thereof, means pivotally mounting the said leg engaging member through the arms thereof on the said support means, lines extended from ends of the arms of said leg engaging member that extend upwardly from said pivotal mounting means, means limiting rearward movement of said leg engaging member, and resilient means urging said leg engaging member against the said limiting means.

ERIE E. HOWSCHULTZ.

REFERENCES CITED

The following references are of record in the file of this patent:

UNITED STATES PATENTS

| Number | Name | Date |
|---|---|---|
| 999,081 | Allison | July 25, 1911 |

FOREIGN PATENTS

| Number | Country | Date |
|---|---|---|
| 458,930 | Great Britain | Dec. 30, 1936 |